United States Patent [19]
Taylor

[11] Patent Number: 5,699,396
[45] Date of Patent: Dec. 16, 1997

[54] CORROSION RESISTANT ZIRCONIUM ALLOY FOR EXTENDED-LIFE FUEL CLADDING

[75] Inventor: Dale Frederick Taylor, Schenectady, N.Y.

[73] Assignee: General Electric Company, Schenectady, N.Y.

[21] Appl. No.: 342,965

[22] Filed: Nov. 21, 1994

[51] Int. Cl.$^6$ ................................................ G21C 3/00
[52] U.S. Cl. .................. 376/416; 376/457; 376/417; 376/414; 148/672; 420/422
[58] Field of Search ................. 876/416, 457, 876/417, 414; 148/672; 420/422; 976/DIG. 43, DIG. 44

[56] References Cited

U.S. PATENT DOCUMENTS

| | | | |
|---|---|---|---|
| 4,200,492 | 4/1980 | Armijo et al. | 176/82 |
| 4,576,654 | 3/1986 | Eddens et al. | 148/11.5 F |
| 4,610,842 | 9/1986 | Vannesjo | 376/416 |
| 4,718,949 | 1/1988 | Takase et al. | 148/11.5 F |
| 4,810,461 | 3/1989 | Inagaki et al. | 376/457 |
| 4,894,203 | 1/1990 | Adamson | 376/416 |
| 5,024,809 | 6/1991 | Taylor | 376/417 |
| 5,245,645 | 9/1993 | Steinberg | 376/457 |
| 5,296,058 | 3/1994 | Steinberg | 148/672 |
| 5,341,407 | 8/1994 | Rosenbaum et al. | 376/409 |

FOREIGN PATENT DOCUMENTS

| | | |
|---|---|---|
| 0155603 | 9/1985 | European Pat. Off. . |
| 2693476 | 9/1992 | France . |

OTHER PUBLICATIONS

Patent Abstracts of Japan, vol. 14, No. 505 (C–0775) 5 Nov. 1990 & JP–A–02 209 443 (Sumitomo Metal Ind. Ltd.) 20 Aug. 1990 (Abstract).

Article– Precipitates in Zircaloy: Identification and the Effects of Irradiation and Thermal Treatment, W.J.S. Yang, et al., J. of Nuclear Materials 138 (1986) pp. 185–195.

Article– Beta–Quenched Zircaloy–4: Effects of Thermal Aging and Neutron Irradiation, W.J.S. Yang et al., American Society for Testing and Materials (1989) pp. 451–464.

Article– Progress in the Knowledge of Nodular Corrosion, F Garzarolli et al., American Society for Testing and Materials (1987) pp. 417–431.

Article—An Oxide–Semiconductance Model of Nodular Corrosion and Its Application to Zirconium Alloy Development, D.F. Taylor, Journal of Nuclear Materials vol. 184 (1991) pp.65–76.

Article—Precipitate Behavior in Zirconium–Based Alloys in BWRs, R.M .Kruger and R.B. Adamson, J. of Nuclear Materials vol.205 (1993) pp. 242–250.

*Primary Examiner*—Michael J. Carone
*Assistant Examiner*—Meena Chelliah
*Attorney, Agent, or Firm*—Noreen C. Johnson; William H. Pittman

[57] ABSTRACT

A zirconium-based alloy with a reduced alloy content is described that has resistance to both uniform and nodular corrosion comparable to present zirconium-based alloy compositions, such as Zircaloy-2. The alloy represents in essence a modified or diluted Zircaloy-2 or Zircaloy-4. The alloys of this invention are also expected to have improved uniform corrosion resistance at under high burn-up conditions The alloy comprises 0.05–0.09 weight percent of iron, 0.03–0.05 weight percent of chromium, 0.02–0.04 weight percent of nickel, 1.2–1.7 weight percent of tin and 0–0.15 weight percent oxygen, with a balance of zirconium. The iron chromium and nickel alloying elements form precipitates in the alloy matrix. The alloy is suitable for use as a cladding material for a fuel element housing fissionable nuclear materials in water cooled nuclear fission reactor. These alloys can also be formed with a reduced nitrogen content of no more than 20 parts per million nitrogen by weight in order to provide enhanced resistance to nodular corrosion.

12 Claims, 4 Drawing Sheets

CORROSION RESISTANT ZIRCONIUM ALLOY FOR EXTENDED-LIFE FUEL CLADDING

BACKGROUND OF THE INVENTION

This invention relates to zirconium-based alloy cladding for use in nuclear fuel elements. More particularly, the invention relates to such cladding having significantly reduced or diluted concentrations of iron, chromium and nickel as compared to conventional zirconium-based alloy cladding. One advantage of this cladding is that it has an initial uniform and nodular corrosion resistance comparable to conventional zirconium-based alloy cladding. Additionally, it offers the likely potential advantage of being more resistant than conventional zirconium-based alloy cladding to uniform corrosion when utilized in nuclear reactors under high burn-up conditions.

Nuclear reactors have their fuel contained in sealed cladding for the isolation of the nuclear fuel from the moderator/coolant system, which consists of water in the case of pressurized water reactors (PWRs) or steam in the case of boiling water reactors (BWRs). The term cladding, as used herein, refers to a zirconium-based alloy tube comprised of at least one alloying element in addition to the zirconium base. The cladding may be composed of more than one layer, such as a zirconium alloy substrate and an unalloyed zirconium barrier. Typically, the cladding is formed in the shape of a tube with the nuclear fuel contained in pellet form therein. These fuel pellets are stacked in contact with one another for almost the entire length of each cladding tube, which cladding tube is ordinarily on the order of 160 inches in length.

Zirconium-based alloys, under normal circumstances, are excellent nuclear fuel cladding since they have low neutron absorption cross sections and, at temperatures below about 398° C. (at or below the core temperature of an operating reactor), are strong, ductile, stable, and non-reactive in the presence of demineralized water or steam. "Zircaloys" are a widely used family of commercially-available, corrosion-resistant, zirconium-based alloy cladding materials. Zircaloys currently are composed of 97–99% by weight zirconium, with the balance being tin, iron, chromium, nickel and oxygen. "Zircaloy-2" and "Zircaloy-4" are tradenames for two zirconium-based alloys that are widely-used for cladding, with Zircaloy-2 being the more extensively used alloy composition. Zircaloy-2 has about 1.2–1.7 weight percent tin; 0.13–0.20 weight percent iron; 0.06–0.15 weight percent chromium, 0.05–0.08 weight percent nickel, and 0.09–0.15 weight percent oxygen, has historically been the preferred alloy for cladding applications. Zircaloy-4 has essentially no nickel and about 0.2 percent iron, but is otherwise substantially similar to Zircaloy-2. In the past, commercially used Zircaloy-2 tended to have concentrations of about 0.15 percent iron, 0.10 percent chromium and 0.05 percent nickel on a weight basis, for a total concentration of these elements of about 0.30 weight percent.

The presence of alloying elements which are relatively insoluble in zirconium under normal conditions, will generally result in "precipitates" forming within an alpha-phase zirconium matrix. Under equilibrium conditions, the matrix is a single phase and will contain the alloying elements at concentrations no higher than their respective solubility limits. The precipitates form a second phase containing higher concentrations of the alloying elements. For example, the precipitates found in the Zircaloys are represented by chemical formulas such as $Zr(Fe,Cr)_2$ and $Zr_2(Fe,Ni)$.

Cladding corrosion is a potential problem both in BWRs and PWRs. Corrosion in a BWR typically occurs in nodular or uniform forms on the zirconium cladding. Nodular corrosion is usually a porous, stoichiometric $ZrO_2$ oxide forming on the surface of the cladding. It can rapidly cover the entire surface of pure zirconium, but it tends to form as small patches (referred to as "nodules" or "pustules") on the surface of the Zircaloys. Uniform corrosion is more prevalent in PWRs, and consists of a uniform layer of $ZrO_2$ oxide forming on the surface of the cladding, and it usually contains a small excess of zirconium. As such, it contains excess electrons giving it a black or gray color and semiconductive properties.

Nodular or pustule corrosion is not inherently bad. However, where the cladding is exposed to water for extended periods, nodular corrosion may concentrate. Concentrated nodular corrosion may act in conjunction with certain contaminants, such as copper ions, and cause localized spalling that may ultimately lead to penetration of the cladding wall and failure of the cladding.

Various approaches have been taken to minimize or eliminate nodular corrosion and the damage that it can cause to cladding. In one widely used approach, the concentrations of alloying elements (particularly iron and nickel) in Zircaloy-2 alloys is increased to about 0.17 percent iron and about 0.06–0.08 percent nickel on a weight basis, such that the total of iron, chromium and nickel is in the range of about 0.33–0.35 percent. This has been found to actually reduce the severity of nodular corrosion under reactor conditions. According to the oxide semiconductance theory of nodular corrosion, the greater availability of aliovalent ions helps to achieve uniform doping of the monoclinic oxide at levels that prevent the inward migration of H+ ions and the formation of disruptive hydrated oxide. Unfortunately, as also explained by the oxide semiconductance theory, increased concentrations of alloying elements also leads to increased rates of uniform corrosion because the oxide semiconductivity increases and promotes the growth of the uniform, protective oxide which comprises uniform corrosion. However, Ostwald ripening (precipitate growth) normally occurs during cladding fabrication and limits the population of precipitates that are sufficiently small to oxidize completely and occupy $Zr^{+4}$ lattice sites in the oxide matrix, thereby limiting the increase in semiconductivity of the oxide layer and the amount of uniform corrosion. Thus, uniform corrosion has not been a significant problem in zirconium-based alloys used for cladding in reactors operated under conditions common in the past This is also probably related to the fact that the solubility of the active alloying elements (e.g. iron, chromium, nickel) in the zirconium matrix, and thus the convened oxide, is only about 5%, and the fact that the majority of the $Zr(Fe,Cr)_2$ and $Zr_2(Fe,Ni)$ precipitates retain their identity in the oxide film and are thus unable to occupy $Zr^{+4}$ lattice sites in the oxide matrix.

However, it is increasingly common to operate nuclear reactors at high "burn-up" (i.e., to high neutron fluences and to nearly complete consumption of the nuclear fuel). Under these conditions, the zirconium-based alloy cladding is exposed to a neutron flux for longer periods than it would experience under normal-burn-up conditions. It is known that high neutron fluences tend to dissolve the thermally stable precipitates that contain normally non-soluble nickel, iron and chromium alloying elements. For example, it has been observed that at fluences beyond about $1 \times 10^{25}$ neutrons per square meter (E>1 MeV), an amorphous transformation becomes evident in Zircaloys at the surface of larger precipitates while smaller precipitates disappear completely into solution, thereby increasing the solute atom concentration of iron, chromium and nickel.

Under such conditions, the thermodynamic solubility of the iron, chromium and nickel in zirconium no longer controls the concentration of these solute atoms, and the zirconium alloy matrix becomes supersaturated with solute atoms. Them is evidence that uniform corrosion increases with increasing neutron fluence exposure. The reason for this increase, based on the above-mentioned theory, would be that the elevated concentration of these supersaturated solute atoms dopes the growing $ZrO_2$ oxide film, increasing its electrical conductivity, and thus accelerating its formation and the occurrence of uniform corrosion. Thus, uniform corrosion may present a more significant engineering concern in reactors operated at high burn-up than it does presently.

In another approach to nodular corrosion containment in these zirconium-based alloys, the precipitates are purposely made small (e.g., less than about 0.1 micrometer in diameter). They may be made small throughout the entire cross-section of the cladding or only in certain regions. For example, it is known to externally treat the outer water-exposed surface of cladding with heating from a coil to produce a fine precipitate exterior surface. Unfortunately, some research has suggested that small precipitates in the Zircaloy metal matrix can increase the danger of crack propagation in the cladding axial direction.

Once a crack is initiated, it may pose little problem, so long as it remains confined to a small area. However, if the crack propagates, the cladding can be breached and the fission material eventually contacts the coolant or moderator. Ultimately, this can lead to an expensive reactor outage.

Although it is highly desirable develop new alloys which avoid increased uniform corrosion at high burn-up as compared to present zirconium-based such as Zircaloy-2, it is also highly desirable that such new alloys maintain present levels of resistance to both nodular and uniform corrosion under normal burn-up conditions.

SUMMARY OF THE INVENTION

This invention is a zirconium-based ahoy cladding having an initial uniform and nodular corrosion resistance comparable to conventional zirconium-based alloy cladding, while offering the likely potential advantage of being more resistant than conventional zirconium-based alloy cladding to uniform corrosion when utilized in nuclear reactors under high burn-up conditions. The invention comprises zirconium-based alloy cladding such as Zircaloys having reduced levels of iron, chromium and nickel.

This invention is an alloy, comprising: 0.05–0.09 weight percent of iron, 0.03–0.05 weight percent of chromium, 0.02–0.04 weight percent of nickel, 1.2–1.7 weight percent of tin and 0–0.15 weight percent oxygen, with a balance of zirconium. These ranges represent significantly reduced concentrations of iron, chromium and nickel as compared to normal Zircaloy compositions. However, these alloys provide resistance to uniform and nodular corrosion comparable to that of present zirconium-based cladding alloys, such as Zircaloy-2, and are expected to exhibit substantially improved resistance to uniform corrosion under high burn-up conditions over such alloys. In a preferred embodiment, the amounts of iron, chromium and nickel are also selected so as to maintain a nominal 3:2:1 ratio of Fe:Cr:Ni.

The invention also comprises: a nuclear fuel element, comprising: a cladding tube having an inner surface region and an outer surface region, said tube comprising a cross-section of a zirconium-based alloy matrix having alloying elements comprising 0.05–0.09 weight percent of iron, 0.03–0.05 weight percent of chromium, 0.02–0.04 weight percent of nickel, 1.2–1.7 weight percent of tin and 0–0.15 weight percent oxygen, and a balance of zirconium, wherein the iron, chromium and nickel alloying elements are in a sufficient concentration to form a plurality of precipitates; and nuclear fuel material disposed within said tube. In a preferred embodiment, the cladding tube will have a plurality of precipitates within the cross-section of the zirconium-based alloy matrix that have a first average size proximate the inner surface of at least about a first predefined diameter and a second average size distribution proximate the outer surface of at most about a second predefined diameter, wherein the first predefined diameter is greater than the second predefined diameter. In a most preferred embodiment, the first predefined diameter is about 0.2 micrometers and the second predefined diameter is about 0.1 micrometers.

Alloys of this invention can also be made with reduced levels of nitrogen, on the order of 20 parts per million (ppm) nitrogen by weight or less, in order to also improve the resistance of these alloys to nodular corrosion.

The principal advantage of the present invention, namely the improvement of uniform corrosion resistance in zirconium-based alloys, particularly at high burn-up, while maintaining similar initial uniform and nodular corrosion resistance by dilution of the iron, chromium and nickel alloy constituents is an unexpected result, particularly in view of the fact that prior approaches to achieving nodular corrosion protection have utilized increasingly higher concentrations of these alloying elements.

Another advantage of alloys of this invention as compared to present zirconium-based alloys, such as Zircaloy-2, is that the reduced concentrations of iron, chromium and nickel will reduce slightly the overall thermal neutron absorbtion cross-section of these alloys as compared to present alloys, thereby increasing reactor efficiency.

DETAILED DESCRIPTION OF THE INVENTION

The use of nuclear fuel at high burn-up (e.g. exposure to neutron fluence levels on the order of $0.33-1.0 \times 10^{26} n/m^2$ or about 40–120 gigawatt-days per metric ton (GWd/mt) of fuel) is increasing. Such exposure imposes new engineering constraints on the zirconium-based alloys manufactured as cladding and used to contain the high burn-up nuclear fuel, particularly on the corrosion properties of these alloys. Previously, nodular corrosion has been the most significant in-situ corrosion mechanism for zirconium-based alloys, such as Zircaloy-2 and Zircaloy-4, used for cladding materials. However, as described above, Applicant believes that uniform corrosion may also become a significant in-situ corrosion mechanism for zirconium-based alloys used at high burn-up. This application for patent describes zirconium-based alloy compositions that are expected to improve the resistance of articles made from these alloys to uniform corrosion at neutron fluence exposure levels associated with high burn-up conditions, based upon the theoretical considerations described herein. These alloys also maintain resistance to uniform and nodular corrosion at levels that are comparable to existing zirconium-based alloys (e.g. Zircaloy-2, Zircaloy-4) under normal burn-up conditions (e.g. less than about 40 GWd/mt).

Relatively little is known about the response of zirconium-based alloys at high burn-up. However, high neutron fluences are known to affect the thermal equilibrium of zirconium-based alloys, particularly the stability of the precipitates of elements such as iron, chromium and nickel that are relatively insoluble in zirconium. At high fluences (e.g. $1 \times 10^{25}$ neutrons per square meter(E>1 MeV)), these precipitates are known to dissolve into the alloy matrix. It has been reported that larger precipitates will tend to partially dissolve with their outer surfaces becoming increasingly amorphous, while smaller precipates may dissolve altogether. The dissolution of some of these precipitates causes the immediately adjacent alloy matrix to become supersaturated with the dissolved elements. With respect to the oxide semiconductance theory of how uniform corrosion occurs, these additional solute atoms should increase the susceptibility of the regions containing these dissolved elements to oxidation, and thus should cause an increase in the rate of uniform corrosion. See, D. F. Taylor, *An Oxide-Semiconductance Model of Nodular Corrosion And Its Application To Zirconium Alloy Development*, Journal Of Nuclear Materials 184, pp. 65–77 (1991). This theory suggests that conductance of electrons or holes across the uniform zirconium oxide layer that forms on the surface of zirconium-based alloys that are exposed to high temperature/pressure water or steam is the rate limiting step with respect to growth of the oxide layer, and hence the rate of corrosion. While this theory was developed largely based on observations and data pertaining to nodular corrosion behavior, it is believed to be equally applicable to uniform corrosion. In the case of nodular corrosion, the objective in order to improve corrosion resistance is to increase the conductance of the oxide to reduce the driving force for transport of hydrogen ions across the oxide layer to the alloy/oxide interface, where their subsequent reduction causes the formation of a hydrated zirconium oxide characteristic of nodular corrosion. In the case of uniform corrosion, the objective is to reduce the conductance across the oxide layer to lessen the driving force for the formation of zirconium oxide at the alloy/oxide interface. Obviously, these two corrosion mechanisms represent competing considerations, and developing alloys that are resistant to both types of corrosion requires making tradeoffs that take both mechanisms into account. The use of Zircaloy-2 alloys with compositions that trend toward the high end of the commercial specification for iron and nickel has helped to assure good nodular corrosion resistance in the present generation of BWR fuel cladding. According to the theory described above, the greater availability of aliovalent ions present in current Zircaloy-2 compositions (as compared to previous Zircaloy-2 compositions with lower levels of iron and chromium as described above) helps to achieve uniform doping of the monoclinic oxide at levels that prevent the inward migration of $H^{+i}$ ons and the formation of a disruptive, hydrated, zirconium oxide. However, this increase in oxide semiconductivity also increases the uniform corrosion rate of zirconium-based alloys having higher levels of iron and chromium, but it is believed that Ostwald ripening of the $Zr_2(Ni,Fe)$ and $Zr(Fe,Cr)_2$ precipitates normally occurs during cladding fabrication and limits the population of precipitates that are sufficiently small to oxidize completely and occupy $Zr^{+4}$ lattice sites in the oxide matrix. Since the solubility of the active alloying elements is only about 5%, and the majority of the precipitates retain their identity in the oxide film, excessive uniform corrosion has not been observed in BWR's. However, under high burn-up conditions, the presence of concentrations of dissolved iron, chromium and nickel in these Zircaloy-2 alloys that are greater than those concentrations associated with thermodynamic equilibrium may increase the conductance of electrons and holes through the oxide layer, thereby increasing the rate of uniform corrosion (or conversely decreasing the corrosion resistance) to undesirable or unacceptable levels. Reducing the total amount of iron, chromium and nickel available for creation of a supersaturated zirconium matrix by neutron-induced dissolution of the precipitates should decrease the rate of uniform corrosion relative to zirconium-based alloys having higher initial concentrations of these alloying elements, such as Zircaloy-2.

Detailed testing to directly confirm such predictions is difficult, due the difficulty in obtaining access to neutron fluxes necessary to conduct the tests, and is compounded by the testing time necessary in-reactor to simulate burn-up conditions. Therefore, claims herein for alloys of this invention are based upon the results of certain indirect test results described in the example below, and the theory described above.

The Alloy Composition

Zircaloy-2 is a tradename for the alloy composition that has historically been preferred for cladding applications. It has about 1.2 to 1.7 weight percent tin, 0.13–0.20 weight percent iron; 0.06–0.15 weight percent chromium, and 0.05 to 0.08 weight percent nickel, and 0.09–0.15 weight percent oxygen. The commercial use of this alloy has varied over time within this range of compositions. Early Zircaloy-2 alloys tended to favor alloys at the lower end of these ranges of composition. As nodular corrosion has become more of a concern, the use of alloys having iron and nickel concentrations at the high end of this range of compositions has been preferred.

As described above, increases in alloy constituent concentration to improve nodular corrosion resistance reduces the resistance to uniform corrosion. However, Applicant has determined a range of alloy compositions that may be described as "dilute Zircaloy-2" alloys that have uniform and nodular corrosion resistance comparable to current Zircaloy-2 alloys, as described further below. To obtain comparable uniform and nodular corrosion resistance at reduced iron, chromium and nickel concentrations is an unexpected result, because prior approaches have emphasized increasing the concentration of the iron and nickel alloying additions to provide adequate nodular corrosion resistance.

Figure 2:
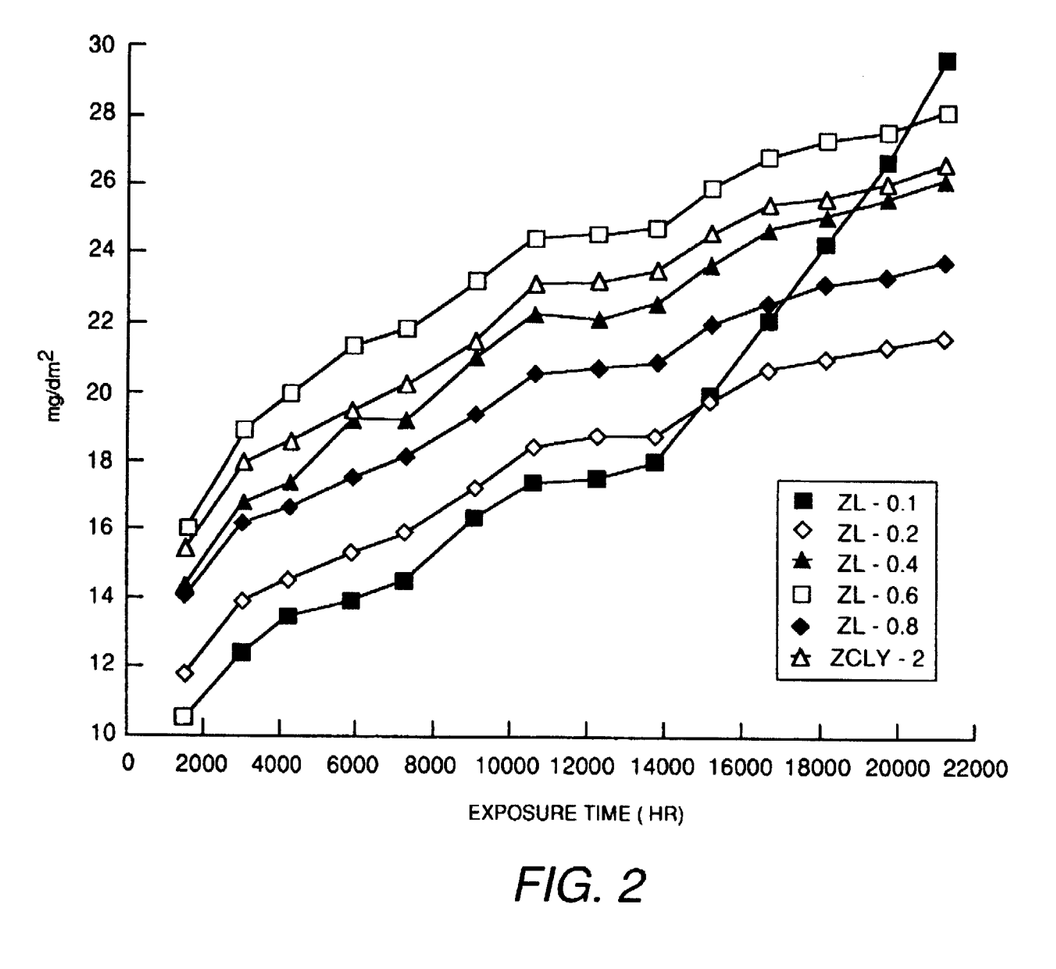
FIG. 2 is a plot of uniform corrosion as a function of time for zirconium-based alloys having various dilution factors, or quantities of iron, chromium and nickel alloying elements, present, when exposed to high temperature water.

With respect to the minimum concentration levels in alloys of the present invention, the lower concentration ranges for iron, chromium and nickel were developed by extrapolating the nodular corrosion test results shown in FIG. 2, which suggests that a dilution factor of 0.3 is the maximum dilution (smallest dilution factor) that could be utilized with a base alloy (representative of Zircaloy-2) without adversely affecting the resistance of the alloys to nodular corrosion. By applying this dilution factor to the base alloys, the minimum absolute values of iron, chromium and nickel were determined to be 0.05 weight percent iron, 0.03 weight percent chromium and 0.02 weight percent nickel. The minimum value of oxygen was selected to be zero based on Applicants observation that increasing levels of oxygen result in increasing rates of uniform corrosion. However, from a practical standpoint given the large heat of formation for zirconium oxide, an oxygen concentration of zero is probably not commercially achievable. Therefore, commercially practical levels of about 300–400 ppm O are more preferred. The concentration of tin was not varied in these experiments, therefore, the minimum value of tin recited in the alloy of the present invention reflects the minimum value of tin (about 1.2 weight percent) utilized in current Zircaloy-2 alloys.

With respect to the maximum concentration levels in alloys of the present invention, the upper concentration ranges for iron, chromium and nickel were selected so as to be less than the lower bounds of the concentration of these elements utilized in the current commercial specification of Zircaloy-2, as described herein. Because oxygen is well-known as a strengthening agent in these alloys, the maximum value of oxygen (0.15 weight percent) was selected to include levels commensurate with the maximum of the current commercial specification. The concentration of tin was not varied in these experiments, therefore, the maximum value of tin recited in the alloy of the present invention reflects the maximum value of tin (about 1.7 weight percent) utilized in current Zircaloy-2 alloys.

In a preferred embodiment, the amounts of iron, chromium and nickel are also selected so as to maintain approximately a nominal 3:2:1 ratio of Fe:Cr:Ni. This ratio provides the stoichiometric quantities necessary to form both $Zr_2(Ni, Fe)$ and $Zr(Fe,Cr)_2$ precipitates.

Other impurities commonly present in Zircaloys, such as nitrogen can also affect the corrosion behavior of these alloys. As described in co-pending patent application Ser. No. 08/215,452 (Attorney Docket GENEP010) filed on Mar. 10, 1994, which is hereby incorporated by reference, reduced levels of nitrogen have been shown to improve the nodular corrosion resistance of zirconium-based alloys such as Zircaloy-2. It is believed that low nitrogen concentrations may also be desirable in alloys of the present invention, and that preferred zirconium-based alloys of this invention will have no more than about 50 ppm nitrogen, more preferably no more than about 30 ppm nitrogen, and most preferably, no more than about 20 ppm nitrogen. While not wishing to be bound by theory, it is believed that the presence of nitrogen raises the activity coefficient of alloying elements such as iron and nickel, thereby reducing their solubility and hence concentration in the alloy matrix. The activity of an alloying element (or any chemical species) is the product of its concentration and activity coefficient. Thus, when nitrogen is present in a significant concentration (e.g., greater than about 20 ppm), it is believed that the concentration of alloying elements dissolved in the matrix decreases and the alloy becomes more susceptible to nodular corrosion. While the precise effect of low nitrogen concentrations on the uniform corrosion rate of alloys of the present invention is unknown, it is believed that the effect will be relatively small because such effects have not been reported previously, and that any negative changes will be more than offset by the significant improvement of such changes on the nodular corrosion resistance. The method for obtaining the preferred low nitrogen concentration described is given in the referenced patent application.

The Tubing Structure

As used herein, the term "tubing" refers to a metal tube having various uses, and the term "fuel rod container" or simply "container" refers to tubing used in nuclear fuel rods to enclose nuclear fuel pellets. Sometimes the fuel rod container is referred to as "cladding" or "cladding tube". The container will have an associated thickness or cross-section formed from a zirconium-based alloy of this invention.

Figure 3:
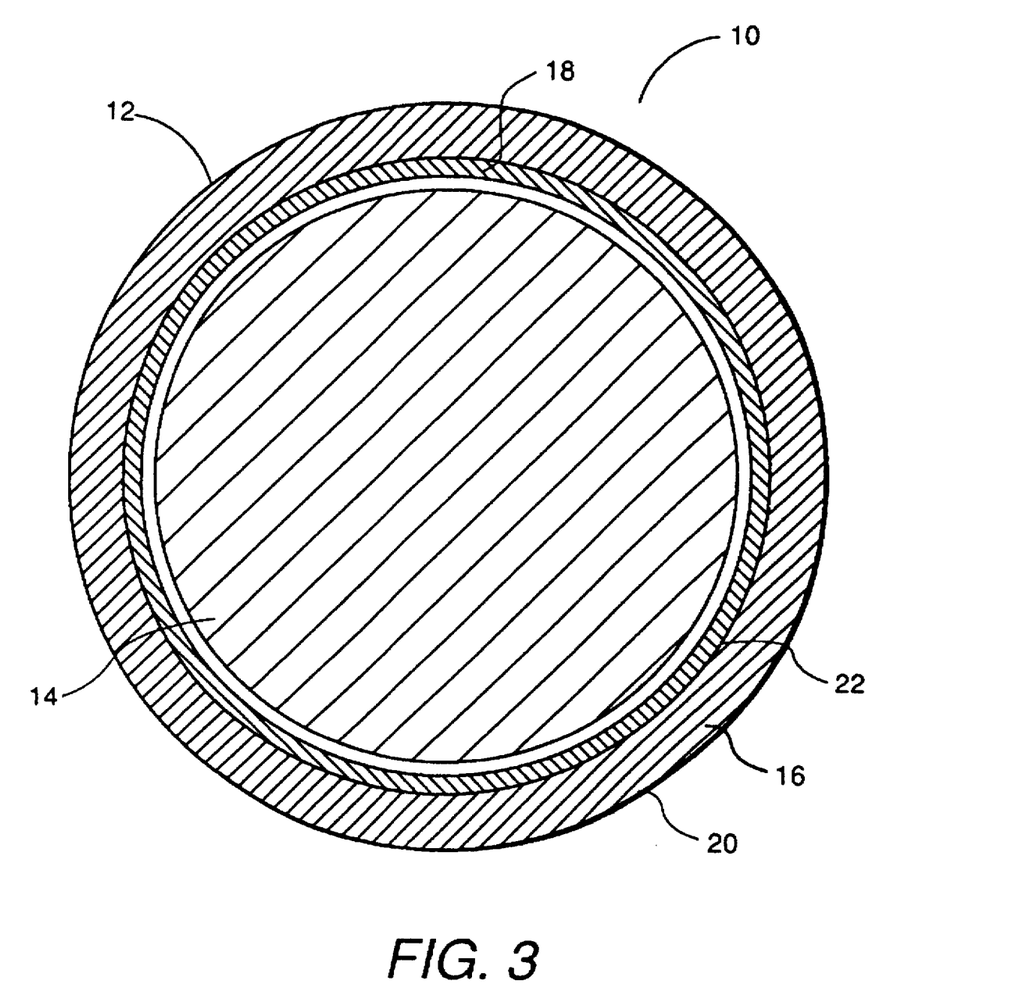
FIG. 3 is a cross-sectional view of a nuclear fuel element of this invention.

Referring to FIG. 3, alloys of the present invention may be used to make a new nuclear fuel element 10 (commonly referred to as a fuel rod) of known construction. Nuclear fuel element 10 comprises a fuel rod container 12 surrounding a fuel material core 14. Nuclear fuel element 10 is designed to known criteria to provide excellent thermal contact between the fuel rod container 12 and the fuel material core 14, a minimum of parasitic neutron absorption, and resistance to bowing and vibration which are occasionally caused by flow of coolant at high velocity. Fuel material core 14 is of known construction, and typically comprises a plurality of fuel pellets of fissionable and/or fertile nuclear material. Fuel material core 14 may have various known shapes, such as cylindrical pellets, spheres, or small particles. Various known nuclear fuels may be used, including uranium compounds, thorium compounds and mixes thereof. A preferred fuel is uranium dioxide or a mixture comprising uranium dioxide and plutonium dioxide.

Container 12 is a composite cladding having a structure comprising zirconium alloy substrate 16 and zirconium barrier 18. The barrier shields substrate 16 from the nuclear fuel material 14 inside the composite cladding. Fuel pellet induced stress may be introduced by, for example, swelling of the pellets at reactor operating temperatures so that the pellet presses against the cladding. In effect, zirconium barrier 18 deforms plastically to relieve pellet-induced stresses in fuel element 10 during swelling. Barrier 18 also serves to inhibit stress corrosion cracking and protects the cladding from contact and reaction with impurities and fission products. The zirconium barrier 18 maintains low yield strength, low hardness, and other desirable structural properties even after prolonged use because it is resistant to radiation hardening. In preferred embodiments, the thickness of barrier layer 18 is between about 50 and 130 micrometers (approximately 2 to 5 mils) and more preferably between about 75 and 115 micrometers (approximately 3.2 to 4.7 mils). In a typical cladding, barrier 18 forms between about 5% to about 30% of the thickness or cross section of the cladding. Generally, the zirconium barrier layer 18 may be made from unalloyed zirconium possessing the desired structural properties. Suitable barrier layers are made from "low oxygen sponge" grade zirconium, "reactor grade sponge" zirconium, and higher purity "crystal bar zirconium". In alternative embodiments, the barrier layer is alloyed with low concentrations of alloying elements such as the chromium, nickel, and iron used in the substrate. The alloying elements and the concentrations at which they appear should be chosen to impart additional corrosion resistance to the barrier layer while maintaining compliance sufficient to prevent damage from pellet-cladding interaction.

In alternative embodiments, cladding 12 also includes an inner layer or liner (not shown) metallurgically bonded to the inner surface of zirconium barrier 18. Method for making such cladding are well-known. In other alternative embodiments, container 12 will contain only substrate 16 and not the zirconium barrier layer. Substrate 16 will utilize the dilute Zircaloy alloys of the present invention as described herein. Substrate 16 will have an outer surface 20 or circumferential region and an inner surface 22 or circumferential region, with zirconium barrier 18 metallurgically bonded to the inner circumferential region.

Figure 4:
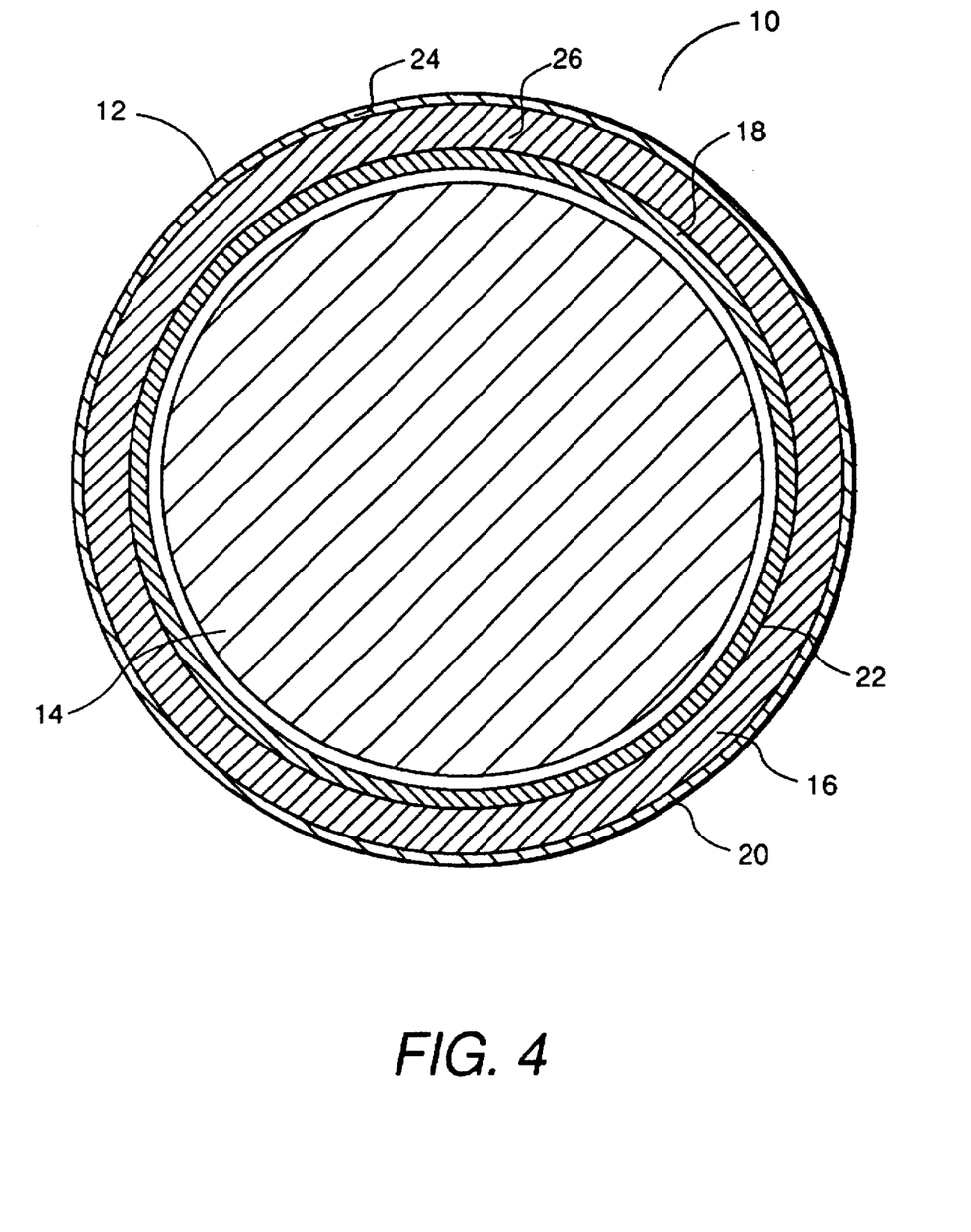
FIG. 4 is a cross-sectional view of a second embodiment of a nuclear fuel element of this invention.

An alternative embodiment of container 12 is shown in FIG. 4. In this embodiment, the basic elements recited in FIG. 3 remain the same, except that zirconium alloy substrate 16 is a composite cladding comprising outer substrate or cladding 24 and an inner substrate or cladding 26. In this embodiment, outer substrate 24 is a dilute Zircaloy of the present invention, and inner substrate 26 comprises a zirconium-based alloy such as Zircaloy-2. The overall thickness of substrate 16 would remain the same as is typical for the currently for fuel elements, about 0.03 inches. However, the relative thicknesses of outer substrate 24 and inner substrate 26 may be varied, depending on the application. For example, it may be desirable that the thickness of outer substrate 24 be relatively thinner, on the order of the thickness of the barrier, while the thickness of inner substrate 26 be relatively thicker, to obtain the benefits of alloys of the present invention which would be exposed to water or steam while retaining a known alloy, with its associated properties, as the primary portion of substrate 16. Benefits might include factors such as a greater quantity of precipitates in inner substrate 26 due to its higher concentration of alloying elements, or they might include factors such as the considerable in-reactor data that has been obtained for Zircaloy-2 alloys.

In some preferred embodiments, substrate 16 will have a preferred microstructure (i.e. precipitate size distribution) that resists corrosion and/or crack propagation. It is known that the microstructure of Zircaloys and other alloys can be controlled by the anneal temperature and time as well as other fabrication parameters. It is also known that in boiling water reactors (BWRs), smaller precipitates generally provide superior resistance to corrosion while in pressurized water reactors (PWRs), larger precipitates generally provide superior resistance to corrosion. In either environment, coarse precipitates are reported to provide improved resistance to axial crack propagation. Therefore, in a preferred embodiment, substrate 16 will have a distribution of coarse precipitates (e.g., greater than about 0.2 micrometers in diameter and preferably between about 0.2 and 1 micrometers in diameter) in the substrate. This will provide significant resistance to crack propagation in the axial direction.

In an alternative embodiment, a dense distribution of fine precipitates (e.g., between about 0.01 and 0.15 micrometers in diameter) is provided in outer surface region 20 (radially) of substrate 16 and a less dense distribution of coarse precipitates (e.g., between about 0.2 and 1 micrometers in diameter) in inner region 22 of substrate 16. This embodiment will be especially preferred in BWRs. In PWRs, preferred substrates 16 will have coarse precipitates (e.g., greater than about 0.2 micrometers in diameter and preferably between about 0.2 and 1 micrometers in diameter) distributed throughout Heat treatment methods for developing such preferred microstructures are well-known.

EXAMPLE 1

The uniform and nodular corrosion behavior of dilute Zircaloy-2 alloys was studied by fabricating a series of dilute Zircaloys having varying concentrations of iron, chromium and nickel and exposing them to a steam environment. It was of interest to determine the minimum alloying concentrations that would maintain nodular corrosion protection, while also minimizing the propensity for uniform corrosion under conditions of high burn-up.

The materials used to prepare these alloys included a Zircaloy-2 ingot having a composition in weight percent of Zr −1.35 Sn −0.17 Fe −0.10 Cr−0.07 Ni, 1250 ppm O, 95 ppm Si and 160 ppm C and a pure Zr crystal bar having the following impurities concentrations in weight percent <50 ppm O, <40 ppm Si, <30 ppm C, 10 ppm Sn, 0.0058 Fe, <50 ppm Cr, <35 ppm Ni. The dilute Zircaloy-2 alloys were prepared by diluting portions of the Zircaloy-2 ingot with the pure crystal bar zirconium. In order to observe just the effects due to changes in the iron, chromium and nickel active elements, the tin and oxygen levels were adjusted by alloying additions to maintain approximately the same concentrations of these elements as found in the Zircaloy-2 ingot. Thus, for an ingot of mass M of which weight fraction $\alpha$ was Zircaloy-2, $$M = \alpha M + X + S + Z \tag{1}$$

where $X$ = wt. of crystal bar zirconium
$S$ = wt. of pure tin
$Z$ = wt. of pure $ZrO_2$ For impurities in the crystal bar zirconium at the detection limit, the mass balance equations for tin and oxygen are, respectively:

$$0.0135 M = 0.0135 \alpha M + 0.00001 X + S \tag{2}$$

$$0.00125 M = 0.00125 \alpha M + 0.00005 X + 0.26 Z \tag{3}$$

since the weight fraction of oxygen in $ZrO_2$ is 2(15.9994)/(91.22+2(15.9994)).

Solving equations (1)—(3) yields $$Z = 4.6244 \times 10^{-3}(1-\alpha) M \tag{4}$$

$$X = 0.98189 (1-\alpha) M \tag{5}$$

$$S = 1.34902 \times 10^{-2} (1-\alpha) M \tag{6}$$

These relationships were the basis for melting six 1.4 pound hemispherical ingots with a maximum thickness of 1 inch, and $\alpha$ values of 1 (pure Zircaloy-2, as a process control), 0.8, 0.6, 0.4, 0.2 and 0.1. These ingots were melted in argon using known non-consumable arc melting techniques. Table 1 lists the average results of duplicate analyses of specimens from the center of each final plate after completion of all processing steps.

TABLE I

Measured Average Compositions Of Dilute Zircaloy-2 Alloys

| Dilution Factor α | Sn | Fe | Cr | Ni | O |
|---|---|---|---|---|---|
| 1 | 1.27 | 0.172 | 0.104 | 0.068 | 0.209 |
| 0.8 | 1.28 | 0.142 | 0.080 | 0.055 | 0.236 |
| 0.6 | 1.29 | 0.109 | 0.056 | 0.040 | 0.227 |
| 0.4 | 1.32 | 0.068 | 0.039 | 0.026 | 0.245 |
| 0.2 | 1.34 | 0.033 | 0.022 | 0.012 | 0.245 |
| 0.1 | 1.32 | 0.014 | 0.012 | 0.004 | 0.219 |

Following melting of the ingots, they were each cut and milled into rectangular blocks 3¼"×2⅜"×¾" long. These blocks were all press forged at 600° C., alternating between the two initially shortest perpendicular directions. The dies were initially at 630° C., and no reheating of the dies was done. Each of the blocks was subjected to reductions of 16,15,13 and 10%. The blocks were then annealed for one hour in argon at 700° C. After annealing, the blocks were press forged at 600° C. as before to reductions of 20% and 35–40%. Following forging, the blocks were hot rolled into strips at 600° C. from a thickness of approximately 0.61" to 0.36" in 5 passes, with reheating after the third pass, followed by a two hour anneal in argon at 600° C. Then the faces of the strip were milled to produce a thickness of 0.32", followed by cold-rolling to 0.175" in 7 passes. The finished strips were then annealed above the beta transus temperature in argon at 1035° C., and water quenched. Oxides were removed by grit blasting, and the faces of the strip were milled to yield a thickness of 0.100". From each strip, a 0.125" wide center portion was removed for analysis, and several ½" wide by ¾" long coupons were removed for corrosion tests. The overall thermo-mechanical processing of the coupons was intended to represent typical processing given to zirconium alloys used for nuclear cladding. The final beta quench was done to produce a free precipitate structure in the alloys and enhance the resistance of the alloys to nodular corrosion.

Two types of corrosion tests were utilized. The first corrosion test consisted of exposing the coupons for 24 hours to steam at 510° C. and 1500 psig, to test the susceptibility of the alloys to nodular corrosion. The steam was deaerated by nitrogen saturation of the water supply at room temperature and pressure. The second corrosion test consisted of immersing the coupons in 288° C. water at 1500 psig and taking periodic measurements of the amount of uniform corrosion by measuring the weight gain due to the growth of the oxide film as a function of time. The liquid refreshment rate in both cases was approximately 20 cc/min through one-liter autoclaves, and local banks of ion exchange columns maintained the resistivity of the incoming water at >15 MW-cm.

Figure 1:
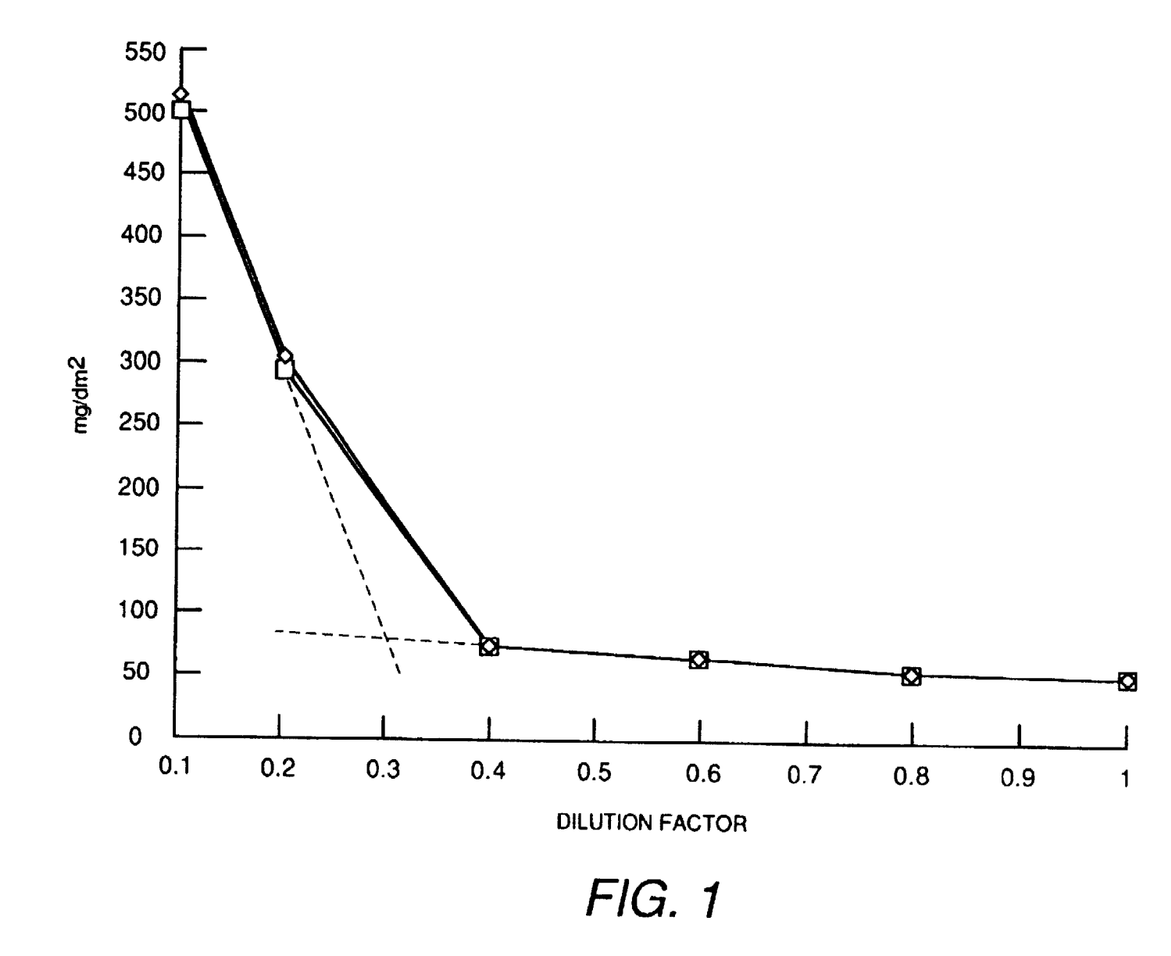
FIG. 1 is a plot of nodular corrosion as a function of the dilution factor, or the quantity of iron, chromium and nickel alloying elements present, for several zirconium-based alloys when exposed to high temperature steam.

As shown in FIG. 1, the steam test did not produce widespread nodular corrosion on any of the coupons. The two lines plotted in FIG. 1 represent nodular corrosion data for duplicate specimens. However, some accelerated nodular corrosion was observed at the edges of the coupons for alloys having dilution factors of 0.1 and 0.2. Based on interpolation of the data shown in FIG. 1, Applicant believes that the lower dilution limit, the limit at which the nodular corrosion resistance will remain comparable to the undiluted Zircaloy-2, is about a dilution factor of 0.3, even though Applicant's closest test data was for an alloy with a dilution factor of 0.4.

The results from the uniform corrosion test are shown as FIG. 2. Initially, the rate of uniform corrosion tended to be somewhat greater in the coupons with least dilution. However, after about 2000 hours of exposure, the uniform corrosion rate was somewhat similar for all of the alloys, regardless of the dilution factor. The only exception was that the alloy with a dilution factor of 0.1 has shown a marked increase in the rate of uniform corrosion after about 14,000 hours of exposure. The uniform corrosion resistance of these alloys at high neutron fluences has not yet been compared, however, based on the theory of uniform corrosion described and referenced above, and morphological changes known to occur in alloys exposed at high neutron fluences also discussed above, Applicant believes that the uniform corrosion resistance of the more dilute alloys will be greater under high neutron fluences than the corrosion resistance of the undiluted alloys.

Therefore, the nodular and uniform corrosion test data indicate that the corrosion behavior of alloys having a dilution factor in the range of about 0.3–0.5 was comparable to the same data obtained for undiluted Zircaloy-2.

Application of the foregoing invention has been described in some detail for purposes of clarity of understanding, however, it will be apparent to one of ordinary skill that certain changes and modifications may be practiced within the scope of the appended claims. For instance, although the specification has described preferred zirconium alloy tubes, other shapes may be used as well. For example, plates and metal sections of other shapes may also be used. In addition, the reader will understand that the alloys described herein can be used in reactor parts other than fuel cladding. For example, alloys of the present invention may be used to make water rods, spacers, channels and other alloy structures and their equivalent for use within a nuclear reactor.

What is claimed is:

1. A nuclear fuel element, comprising:
   a cladding tube having an inner surface region and an outer surface region, said tube comprising a cross-section of a zirconium-based alloy matrix having alloying elements comprising 0.05–0.09 weight percent of iron, 0.03–<0.05 weight percent of chromium, 0.02–0.04 weight percent of nickel, 1.2–1.7 weight percent of tin and 0–0.15 weight percent oxygen, and a balance of zirconium, wherein the iron, chromium and nickel alloying elements are in a sufficient concentration to form a plurality of precipitates; and
   nuclear fuel material disposed within said tube.

2. The nuclear fuel element of claim 1, wherein the precipitates have an average size distribution within the zirconium-based alloy matrix of at least about 0.2 micrometers in diameter.

3. The nuclear fuel element of claim 1, wherein the plurality of precipitates that have an average size proximate the inner surface of at least about a first predefined diameter and the precipitates have an average size distribution proximate the outer surface at most about a second predefined diameter, wherein the first predefined diameter is greater than the second predefined diameter.

4. The nuclear fuel element of claim 3, wherein the first predefined diameter is about 0.2 micrometers and the second predefined diameter is about 0.1 micrometers.

5. The nuclear fuel element of claim 1, further comprising a zirconium barrier layer metallurgically bonded to the inner surface region of said cladding tube.

6. The nuclear fuel element of claim 5, wherein the barrier layer is selected from the group consisting of crystal bar zirconium and sponge zirconium.

7. The nuclear fuel element of claim 1, further comprising nitrogen as an alloying element in said cladding tube in a concentration of no more than about 20 ppm by weight.

8. A nuclear fuel element, comprising:
   a cladding tube having an inner surface and an outer surface, said cladding tube comprising an outer cladding alloy and an inner cladding alloy that are metallurgically bonded to one another, wherein the outer cladding alloy comprises <0.05–0.09 weight percent of iron, 0.03<0.05 weight percent of chromium, 0.02–0.04 weight percent of nickel, 1.2–1.7 weight percent of tin and 0–0.15 weight percent oxygen, and a balance of zirconium and the inner cladding alloy is a zirconium-based alloy, wherein the iron, chromium and nickel alloying elements in both the outer cladding alloy and inner cladding alloy are in a sufficient concentration to form a plurality of precipitates; and
   nuclear fuel material disposed within said tube.

9. The nuclear fuel element of claim 8, wherein the zirconium-based alloy has a composition comprising 0.13–0.20 weight percent iron; 0.06–0.15 weight percent chromium, and 0.05–0.08 weight percent nickel, 1.2–1.7 weight percent tin and up to 0.15 weight percent oxygen, with a balance of zirconium.

10. The nuclear fuel element of claim 9, wherein the wherein the precipitates within these alloys that have an average size distribution of at least about 0.2 micrometers in diameter.

11. The nuclear fuel element of claim 9, wherein the precipitates have an average size proximate the inner surface of at least about a first predefined diameter and the precipitates have an average size distribution proximate the outer surface at most about a second predefined diameter, wherein the first predefined diameter is greater than the second predefined diameter.

12. The nuclear fuel element of claim 11, wherein the first predefined diameter is about 0.2 micrometers and the second predefined diameter is about 0.1 micrometers.

* * * * *